E. D. HALE.
NUT LOCK.
APPLICATION FILED DEC. 31, 1913.

1,117,563.

Patented Nov. 17, 1914.

Witnesses

Inventor
E. D. Hale.

By
Attorneys.

UNITED STATES PATENT OFFICE.

ELBERT D. HALE, OF CLARKSTON, WASHINGTON.

NUT-LOCK.

1,117,563. Specification of Letters Patent. Patented Nov. 17, 1914.

Application filed December 31, 1913. Serial No. 809,713.

*To all whom it may concern:*

Be it known that I, ELBERT D. HALE, a citizen of the United States, residing at Clarkston, in the county of Asotin and State of Washington, have invented certain new and useful Improvements in Nut-Locks, of which the following is a specification.

This invention relates to nut locks, and has as its object to provide a structure wherein the nut may be locked in operative position upon the bolt at practically any point in its rotary movement thereon.

A further object of the invention is to provide a structure, for accomplishing the above results, which may be applied with but slight structural change, to bolts and nuts as now in common use.

A still further object of the invention is to provide a nut-lock which will be simple in construction and which, at the same time, will positively prevent the nut from working loose upon the bolt.

With these and other objects in view, the invention consists in certain constructions and arrangements of the parts that I shall hereinafter fully describe and claim.

For a full understanding of the invention reference is to be had to the following description and accompanying drawing, in which:—

Figure 1:
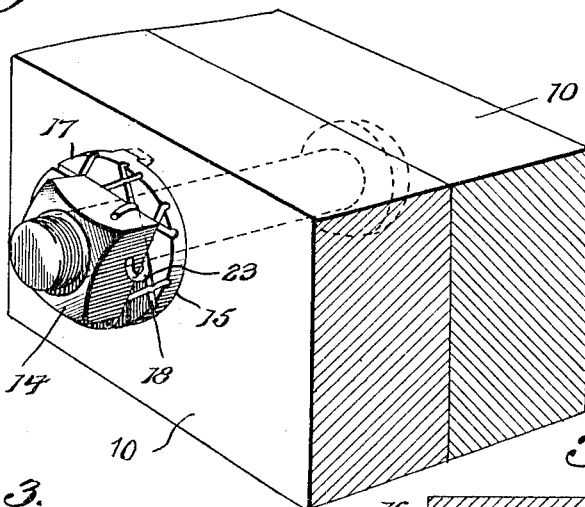
Figure 3:
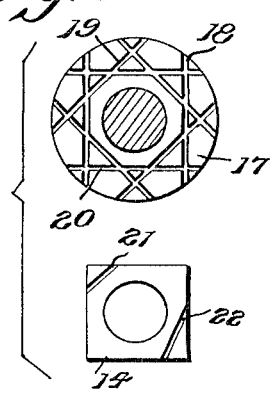
Figure 2:
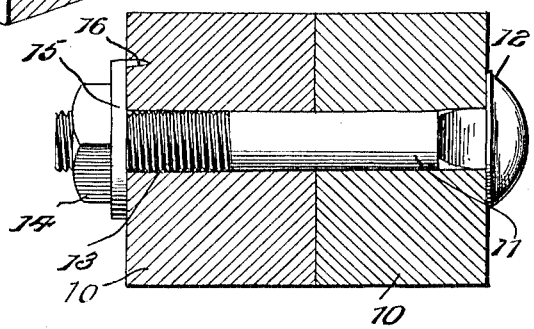
Figure 5:
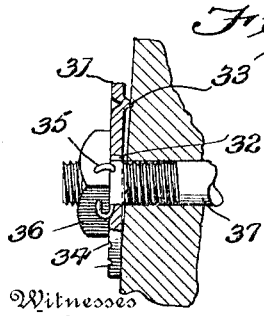
Figure 4:
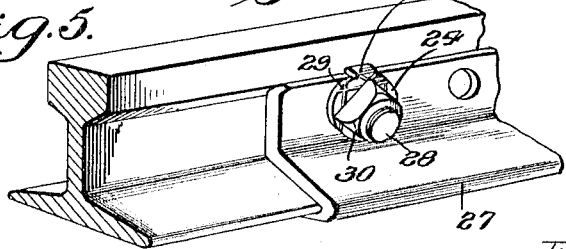

Figure 1 is a perspective view of my improved nut lock, showing the parts thereof in operative relation. Fig. 2 is a side view thereof. Fig. 3 is a detail plan view of the locking washer and nut. Fig. 4 is a perspective view of the modified form of the invention, and Fig. 5 is a fragmentary sectional view of a modified form of locking washer.

Corresponding and like parts are referred to in the following description and indicated in all the views of the accompanying drawing, by the same reference characters.

For the purpose of convenience I have illustrated in Figs. 1 and 2 of the drawing my improved nut-lock as used in connection with a wooden body-member conventionally shown and designated 10, and which includes a bolt 11 having at one end a head 12 and is screw-threaded adjacent its opposite extremity, as at 13 to receive the nut 14. Mounted for free movement upon the bolt 11 is a locking washer 15 which has integrally formed thereon adjacent its periphery a spur 16 adapted to engage the face of the body-member 10 to prevent the independent rotation of the washer upon the bolt. The outer face 17 of the locking washer 15 is formed with a plurality of tangential intersecting grooves 18, each of said grooves extending entirely across the face 17 of the washer and opening upon the edges thereof. These grooves 18 are disposed in rectangular relation, as shown, one set of grooves 19 being angularly disposed with relation to the other set 20. The nut 14 has formed in its inner face, adjacent opposite corners, transversely extending grooves 21 and 22, the groove 22 extending across the nut at an angle slightly less than that of the groove 21, and is consequently longer, as illustrated.

In the practical use of my invention, the locking washer 15 is placed on the threaded extremity 13 of the bolt 11, the spur 16 being disposed to engage the body-member 10. The nut 14 is then screwed down against the locking washer, the grooves 21 and 22 thereof, being adjacent the grooves 18 formed in the washer 15. When these grooves are so disposed as to coincide a locking-key 23 is positioned therein and bent upwardly at its extremities against the side walls of the nut 14, thereby securely locking the nut in operative position on the bolt 11. Said locking key 23 may be formed of wire or any other suitable material.

Particular attention is directed to the relative disposition of the grooves upon the locking washer and nut. Said grooves upon the nut are so disposed that when one of said grooves, say 21, for instance, moves out of alinement with one of the grooves upon the locking washer, the groove 22 of the nut will come into alinement with the next adjacent groove upon the opposite side of the washer. Consequently, only a slight turn of the nut is required to bring either one or the other of said grooves therein into alinement with one of the grooves on the locking washer, thereby making it possible to lock the nut upon the bolt at practically any point in its rotary movement thereon.

In Fig. 4 of the drawing I have illustrated a modified construction of the locking washer 24, such washer being especially adapted for use in connection with the locking of bolts on rail joints. In this form of the invention the locking washer 24 is provided on one side with an integrally formed inwardly extending flange 26, adapted to fit over the upper edge of the fish-plate 27, and thereby prevent independent rotary movement of the washer 24 upon the bolt 28. The locking washer 24 is grooved in its outer face at 29 in the same manner as above described, with reference to the preferred form of the invention and the nut 30 is also similarly grooved upon its inner face, as above described, said grooves when in alinement, being adapted to receive a locking key. It will be noted that this form of invention is exceedingly simple and provides an effective means for locking the nuts of rail joints.

While I have illustrated the nut used in connection with my improved nut lock as being provided with only two grooves in its inner face, still it is to be understood that I do not limit myself to this number of grooves, as similar grooves may be provided adjacent each corner of the nut.

In Fig. 5 of the drawings I have illustrated a modified form of locking washer especially designed for use in connection with metal surfaces. Said washer, designated 31, is provided with a central aperture 32, designed to receive the threaded extremity of the bolt and has pressed out adjacent its periphery a lug 33 adapted to engage against a metal surface to hold the washer against rotary movement. The outer face of the washer is grooved at 34, said grooves being designed to coincide with the grooves formed in the nut, as used in connection with my invention, said coinciding grooves being adapted to receive a locking key 35. The washer 31 is preferably resilient and when placed against the metal surface will be spaced therefrom at one edge by the lug 33, as best shown in Fig. 5, the body portion of the washer being disposed at an angle to such metal surface. Consequently, when the nut 36 is screwed down upon the bolt 37, to clamp the locking washer, the body portion thereof will be sprung inwardly, causing the lug 33 to engage against the metal surface, thereby holding the washer against rotary movement upon the bolt.

It will therefore be seen that I have provided a very simple and effective structure for the purpose set forth which may be readily applied and which will positively prevent the nut from working loose upon the bolt.

Having thus described the invention, what is claimed as new is:

A nut lock including a bolt, a locking washer mounted upon the bolt, said washer having angularly arranged sets of rectangularly disposed intersecting grooves formed in one face thereof, means for preventing independent rotary movement of the washer, a nut screw threaded upon the bolt, said nut having non-parallel grooves formed in one face thereof upon opposite sides of the nut and so arranged that as one of said grooves is progressively moved out of coinciding relation with one of the grooves of one set upon one side of the washer, the groove upon the opposite side of the nut will be progressively moved into coinciding relation with the next adjacent groove of the other set upon the opposite side of the washer, and a locking key positioned in said coinciding grooves.

In testimony whereof I affix my signature in presence of two witnesses.

ELBERT D. HALE. [L. S.]

Witnesses:
BURT HALSEY,
ELMER E. HALSEY.

Copies of this patent may be obtained for five cents each, by addressing the "Commissioner of Patents, Washington, D. C."